United States Patent [19]

[11] 3,723,644

Haskell et al.

[45] Mar. 27, 1973

[54] VARIABLE FRAME RATE RECORDING SYSTEM USING SPEED MEASUREMENT

[75] Inventors: Barin Geoffry Haskell, John Ormond Limb, both of New Shrewsbury, N.J.

[73] Assignee: Bell Telephone Laboratories, Incorporated, Murray Hill, Berkeley Heights, N.J.

[22] Filed: Apr. 24, 1972

[21] Appl. No.: 247,021

[52] U.S. Cl. ..........................178/6.6 P, 179/100.2 S
[51] Int. Cl. ..........................H04n 5/78
[58] Field of Search......178/6. 6 R, 6. 6 P, 6.6 FS; 179/100.2 S

[56] References Cited

UNITED STATES PATENTS 3,520,993 7/1970 Jacoby ................................78/6.6 P

*Primary Examiner*—Terrell W. Fears
*Attorney*—R. J. Guenther et al.

[57] ABSTRACT

A variable frame rate video recording system utilizes the speed of movement in the video scene to vary the frame recording rate. The speed measurement signal is converted into a frame repetition signal. The frame repetition signal is applied to a switch control which prevents frames containing little movement or highly redundant information from entering a storage medium. With each recorded frame is stored the output signal of a counter which indicates the number of times each recorded frame is to be used for display. A switch control circuit in a readout circuit, in response to the stored output signal of the counter, causes each recorded frame to be repeated at the output terminal to maintain a constant frame rate.

7 Claims, 2 Drawing Figures

VARIABLE FRAME RATE RECORDING SYSTEM 111

SPEED MEASUREMENT CIRCUIT

VARIABLE FRAME RATE RECORDING SYSTEM USING SPEED MEASUREMENT

BACKGROUND OF THE INVENTION

This invention relates to the storage of video signals and, more particularly, to the storage of video signals by a system that utilizes speed of a moving object in the video image to eliminate redundant information.

In a typical closed circuit television system, such as PICTUREPHONE, there is generally only one moving object in the video image. Due to the nature of this video image, an inverse correlation is present between the redundancy of the video information in the video image and the speed of the moving object. Specifically, a video image with a slowly moving object contains mostly redundant information, while a fast moving object in the same video image greatly reduces the redundancy of the information. Various arrangements have been devised by those working in the art to detect the movement of an object in the video image, but little has been done to determine the speed at which the object is moving. Although determining the speed would seem to be one step removed from detecting motion, the variation in detail and size of the moving object are factors which influence speed measurement and must be taken into account before the speed can be determined with some degree of accuracy. A system that performs two-dimensional cross-correlation between segments of the picture, called picture elements, in adjacent frames of the video image can take these factors into account in order to determine the displacement of a moving object. This displacement can be measured over a selected interval of time to determine the velocity of the object. However, a cross-correlation system is quite complex and requires an extensive amount of hardware to determine the presence of a correlation between adjacent frame picture elements corresponding to a displaced object. Furthermore, only the speed rather than velocity is required for redundancy reduction by speed measurement since the direction of the movement is not significant in determining the redundancy of the information in the video image. In video systems, a control signal with a magnitude that is proportional to the speed could be used readily to reduce the quantity of video information without a reduction in quality which is discernible to the viewer. An arrangement that develops a control signal by a comparatively simple means has many possible applications in the storage and transmission of video information.

SUMMARY OF THE INVENTION

In an illustrative embodiment of the invention, a video signal is generated in the form of a series of successive digital words with each representing the brightness of a particular picture element. A speed measurement circuit analyzes the video signal both to detect areas of the picture in movement and to determine the speed of the moving object. In each frame the total moving area frame-to-frame difference signal is compared with the total moving area element-to-element difference signal to produce an estimate of the speed of the moving object in that frame. The output signal of the speed measurement circuit is then converted into an integer frame repetition factor. The frame repetition factor signal is applied to a switch control which operates switches located in the signal paths to a storage medium for the video signal and the frame repetition factor signal. When there is a lack of movement in the video image, the speed measurement circuit provides an output signal which is converted into a high frame repetition factor. When movement is fairly rapid the speed measurement circuit provides an output signal which is converted into a low, but not less than one, frame repetition factor. The frame repetition factor is the number of times a particular frame is to be displayed at the time of readout. The switch control, in response to a frame repetition factor greater than one, opens the switches in the signal paths to the storage medium. The frames in the input signal generated while the switches are opened are eliminated and not stored. After the appropriate number of frames have been eliminated which is equal to the frame repetition factor minus one, the switches are closed. The frame repetition factor corresponding to the previously recorded frame is then fed to the storage medium by means of another signal path, and a new frame of video information is fed into the storage medium. The storage medium retains each frame with its frame repetition signal for future access by a readout circuit. Thus, the video frame recording rate increases with the speed of movement represented by the video signal.

The storage medium supplies a video output signal and a frame repetition signal which are utilized by a read-out circuit to provide a video signal at a constant frame rate. The video and the frame repetition signals are respectively applied to a frame delay and a switch control through two separate switches. The switch control changes the position of the switches whenever the frame repetition signal applied to its input exceeds one. When the frame repetition signal exceeds one, the switch in the video signal path causes video information stored in a frame delay to be recirculated in a loop to supply a repetitious output signal for the recording system. These repetitious frames take the place of the frames which were eliminated during the recording of video information into the storage medium. After the repetitious frame has been displayed a number of times in accordance with the value of the frame repetition signal, the switch control enables new video information to be obtained from the storage medium. Thus, the readout system maintains a constant frame rate using video information which is recorded at a variable frame rate to substantially eliminate redundant information contained in the video frames.

A feature of the present invention is the arrangement of the switches and the switch control responsive to the speed measurement circuit to prevent frames containing substantially redundant information from being recorded in the storage medium.

Another feature of the present invention is the speed measurement circuit that evaluates the speed of a moving object by comparing the total moving area frame difference signal in a frame with the picture element-to-element difference signal summed over the moving object.

These and other features of the invention will become apparent upon reading the detailed description in conjunction with the accompanying drawings.

DETAILED DESCRIPTION

Figure 1:
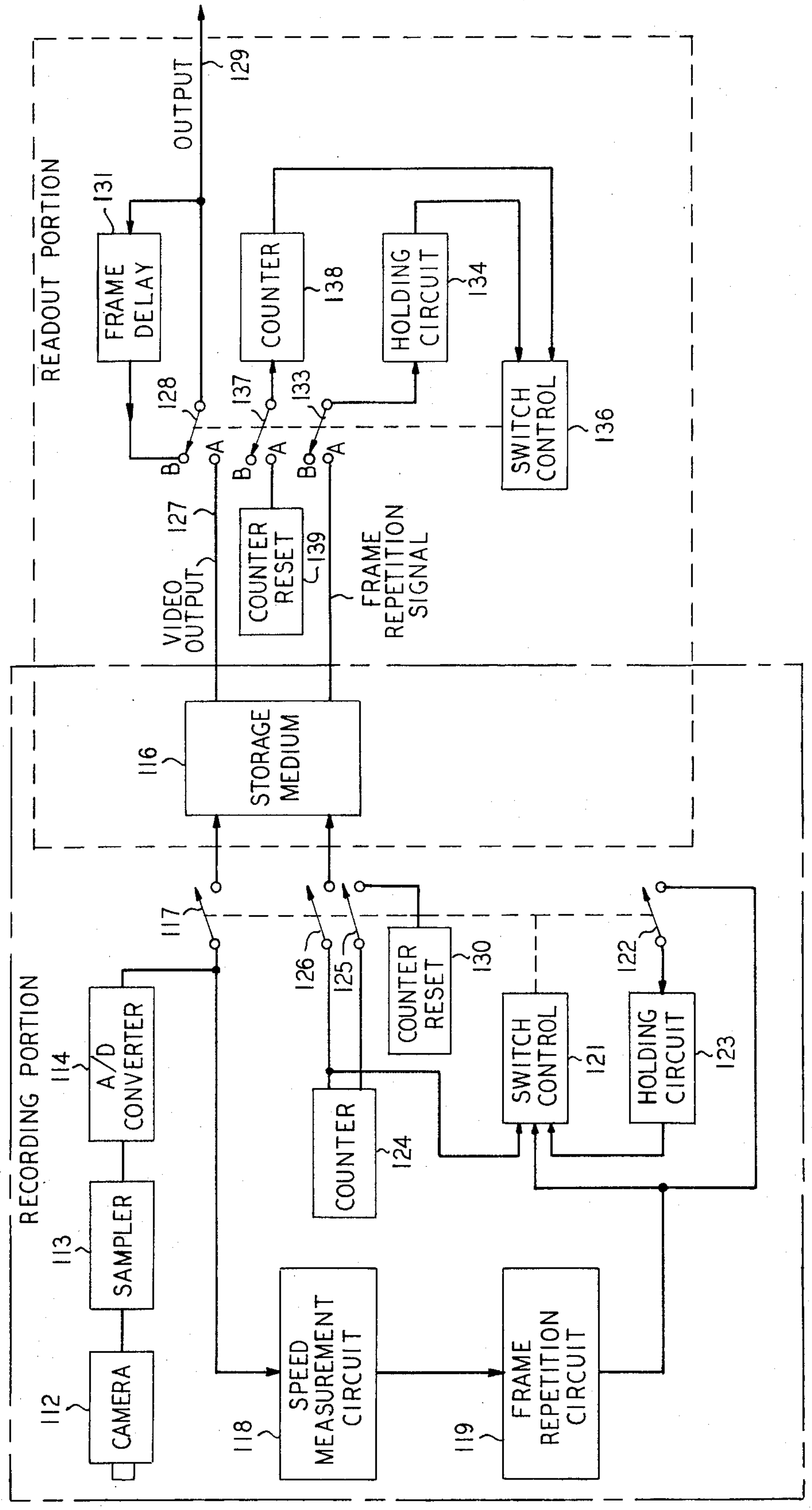
FIG. 1 is a block diagram of a variable frame rate recording system constructed to operate in accordance with the present invention.

In FIG. 1, the block diagram of the variable frame rate recording system 111 is shown embodying the features of the present invention. The variable frame rate recording system 111 comprises a recording portion and a readout portion. The recording portion is enclosed in dot-dashed lines and the readout portion is enclosed in dotted lines. Operation of the system shall be discussed in two parts, with the recording portion being discussed first.

A digital video input signal is supplied by the cascade connection of a camera 112, a sampler 113, and an analog-to-digital converter 114. The sampler 113 divides the video signal into a successive series of picture elements. Each picture element is represented by a digital word at the output of the converter 114. Conventional synchronizing can readily be used to provide an input signal that operates at any predetermined frame rate. The input signal is applied to a speed measurement circuit 118 and to a storage medium 116 through a switch 117. The speed measurement circuit 118 generates an output signal at the end of each frame indicative of the speed of a moving object in the video image. A detailed discussion of the structure and operation of the speed measurement circuit will be given later with reference to FIG. 2. A frame repetition circuit 119 is connected to the output of the speed measurement circuit 118 to convert its output signal into a frame repetition factor signal. The frame repetition factor signal is applied to a switch control 121 directly and also indirectly through a switch 122 and a holding circuit 123. The output signal of a counter 124 is applied to the switch control 121 and to the storage medium 116 through a switch 126. As indicated by the dashed lines in FIG. 1, switches 117, 122, 125 and 126 are all controlled by the switch control 121. For the sake of simplicity, a synchronizing circuit is not shown which would be connected to the camera 112 and the switch control 126.

The operation of the recording portion of FIG. 1 shall now be explained. Initially, switches 117, 122, 125 and 126 are closed. Switch 117 completes a signal path for an interval which allows the first frame of video information to be fed to storage medium 117. However, switches 122, 125 and 126 close momentarily during the intervals which are between the closures of switch 117. The first frame enters the speed measurement circuit 118, but it requires two successive frames to evaluate speed. Thus, the speed measurement circuit 118 produces a high level output which causes the frame repetition circuit 119 to produce a unity frame repetition factor. The switch control 121 compares the frame repetition factor stored in the holding circuit 123 to the output of the counter 124. The counter 124 was reset to one when it was connected initially to the counter reset 130 by switch 125. At the same time, an initial frame repetition factor indicative of one was applied to the holding circuit 123 when switch 122 was closed. Since the two values are equal at the end of the first frame, the switch control 121 causes switches 122, 125 and 126 to close momentarily as they were initially. As a result, the output of the counter 124 is read into the storage medium 116 via switch 122 and the counter 124 is thereafter reset to one. Then switch 117 is closed and the second frame of the video signal enters the storage medium 116. The speed measurement circuit 118 compares the second frame with the first to evaluate the speed of any movement present in the video image.

After the first two frames of information have been recorded, the speed measurement circuit 118 prodcues an output indicative of the speed of movement in the video image. If the object is moving at a relatively high speed, the speed measurement circuit 118 continues to produce a high level output. The frame repetition circuit 119, in response to this high level output, produces a frame repetition signal of unity value which equals the output of the counter 124. Under this condition, the switch control 121 operates all the switches at the end of each frame as was done between the first two frames, and the output of counter 124, which in this case is equal to one, enters the storage medium 116 via switch 126 to indicate that the second frame is to be displayed only once at readout time. Then, the third frame enters the storage medium 116 via switch 117. However, if the speed of the moving object is relatively slow, the speed measurement circuit 118 produces a low level output which the frame repetition circuit 119 converts into a signal having greater than unity value which is not equal to the output of counter 124. Now, the switch control 121, in response to the frame repetition signal, opens switches 117, 122, 125 and 126. The holding circuit 123 stores the value of the frame repetition signal for later access by the switch control 121. The counter 124, in response to the opening of switch 125, starts at one and is incremented by one shortly after the start of each frame during which the switches 117, 122, 125 and 126 remain open. Since only a small amount of movement is present in these frames, they contain a large amount of redundant information and are prevented from entering the storage medium 116 when switch 117 is open. Thus, at the end of each frame, the output of counter 124 indicates one plus the number of frames which have been skipped since the last time the switches 117, 122, 125 and 126 were closed. The switch control 121 compares the value of the output signal of the counter 124 with the value of the frame repetition signal stored in the holding circuit 123. The switch control 121 keeps all of the switches open-circuited until the end of that particular frame when these two values are equal. When the two values are equal, the switch control closes all the switches to enable the recording of a new frame of the video signal by the storage medium 116 and to enable the output of the counter 124 to be read into the storage medium. As shall be explained later, the readout portion of the variable frame rate recording system 111 repeats the recorded frames in accordance with the frame repetition signal to make up for the eliminated frames to supply a video signal at a constant frame rate.

If, on the other hand, the speed of the movement should increase while switches 117, 122, 125 and 126 are open, some means of closing the switches is necessary to prevent the elimination of nonredundant information which would reduce the viewing quality of the stored video image. To prevent impairment of the video image, the switch control 121 also compares the current frame repetition signal received directly from the frame repetition circuit 119 with the output of the counter 124. If at the end of a particular frame the current value of the frame repetition signal becomes less than the output of the counter 124, the switch control 121 closes switches 117, 122, 125 and 126. Therefore, new video information enters the storage medium 116 to prevent a reduction in the quality of the video signal stored by the storage medium 116.

The readout portion of the variable frame rate recording system 111 shall now be explained. The readout portion comprises the storage medium 116, switches 128, 137 and 133 controlled by a switch control 136, a frame delay 131, a counter 138, a counter reset 139 and a holding circuit 134. Each of these components which are similar to components in the recording portion perform analogous functions. The video signal and the frame repetition factor are respectively applied to switches 128 and 133. Initially, the switch control 136 closes switches 128, 133 and 137 until the first frame has been read from storage medium 116 and the corresponding frame repetition signal has been applied to the input of switch control 136 via the holding circuit 134. This switch position is designated A. When switch 137 is in position A, the counter 138 is rest to one. Then, normal operation begins. If at the end of a particular recorded frame the frame repetition signal represents a value which is greater than the output of counter 138, switches 128, 133 and 137 all change to the position designated B. The counter 138 starts from one and increases the count by one shortly after the start of each displayed frame during which the switches 128, 133 and 137 are in position B. At the end of each displayed frame, the switch control 136 compares the frame repetition factor stored in the holding circuit 134 with the output of the counter 138. When these two signals are equal in value, the switch control 136 changes switches 128, 133 and 137 to position A. The closure of switch 137 connects the counter 138 to the counter reset 139 which resets the counter 138 to one. Then a new frame is read from storage medium 116 and transmitted via switch 128 to output terminal 129, and a new frame repetition factor is read into the holding circuit 134. As was stated earlier, the frame repetition factor indicates how many times each frame of the video signal stored in the storage medium 116 has to be made available at the output terminal 129 to maintain a constant frame rate. As the switch 128 connects the storage medium 116 to the output terminal 129, the video signal from the storage medium 116 is applied to the frame delay 131 at the same time it is available at the output terminal 129. If the switch 128 is in position B, the frame stored in the frame delay 131 is repeated by connecting the output of the frame delay 131 to its input and to the output terminal 129. This causes the video information stored in the frame delay 131 to be recirculated to repeat the stored frame again at the output terminal 129. Thus, the switch 128 either provides access to new video information in the storage medium 116 or repeats the video information which is stored in the frame delay 131. The repetition of the stored frames in the frame delay 131 maintains a constant frame rate at the output terminal 129. Therefore, the constant frame rate is achieved by operating the switches 128, 133 and 137 in accordance with the value of the frame repetition signal for each frame of information contained in the storage medium 116.

Figure 2:
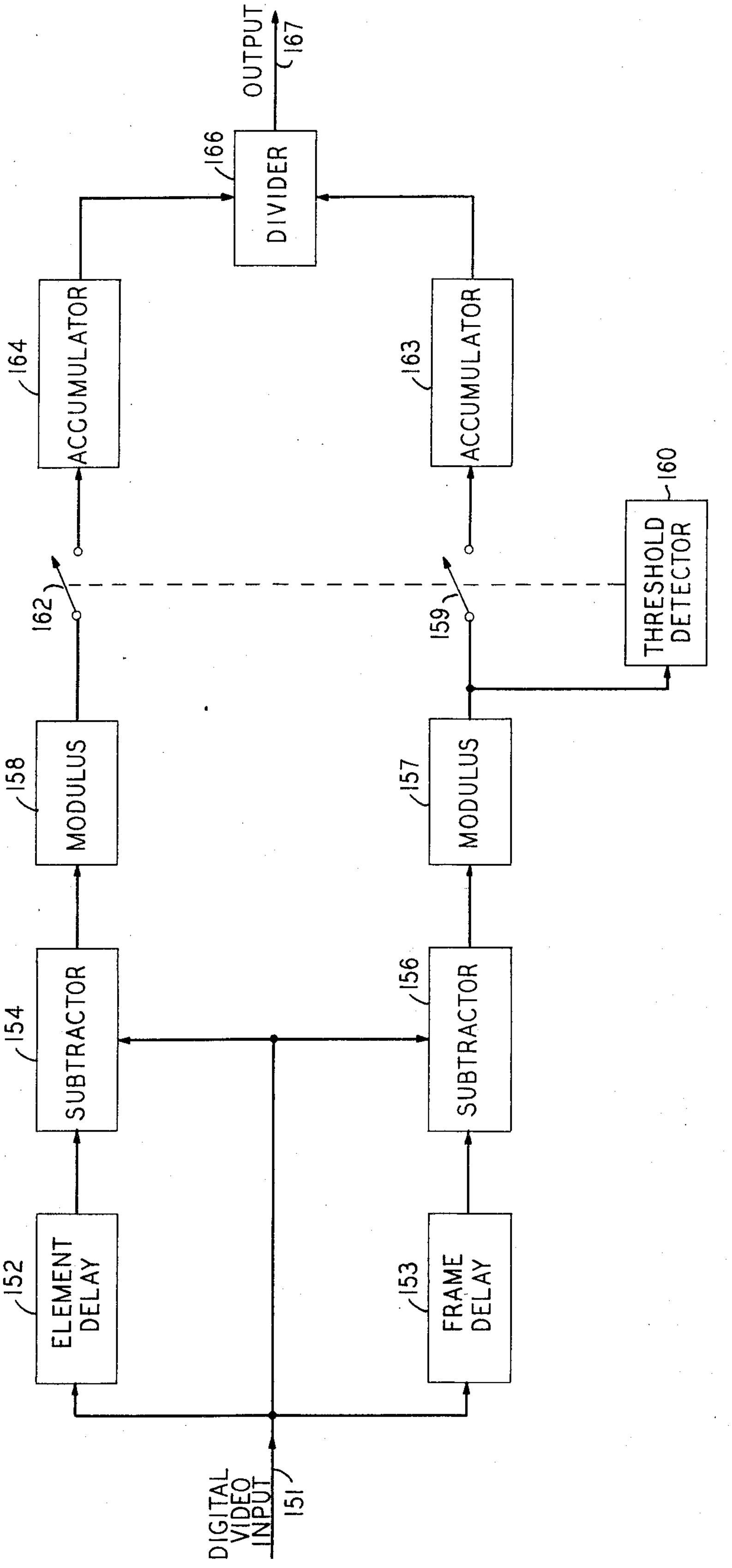
FIG. 2 is a block diagram of a speed measurement circuit utilized in FIG. 1.

FIG. 2 is a block diagram of a speed measurement circuit 118. The speed measurement circuit 118 comprises a digital video input terminal 151, a single element delay 152, a frame delay 153, subtractors 154 and 156, moduli 157 and 158, a threshold detector 160, switches 159 and 162, accumulators 163 and 164 and a divider 166 with an output terminal 167. The digital video input signal applied to the input terminal 151 is applied to element delay 152 and frame delay 153. The input signal is also applied to subtractors 154 and 156. The output signal from the frame delay 153 is subtracted from its input signal by the subtractor 156. The output from subtractor 156 which is the frame difference signal is applied to the modulus 157. The modulus 157 takes the absolute value of the frame difference signal and applies it to switch 159 and the threshold detector 160. In a similar manner, the absolute value of an element difference signal is applied to the switch 162 by operation of the subtractor 154 and modulus 158. When a moving object is present in the video input signal, the absolute magnitude of the frame difference signal exceeds a predetermined level in the threshold detector 160. In response to this condition, the threshold detector 160 closes switches 159 and 162. This allows the accumulator 163 to sum the absolute magnitudes of all of the frame difference signals in the moving area produced between corresponding picture elements of adjacent frames. At the same time, switch 162 is closed and the absolute magnitudes of all of the element difference signals produced between adjacent picture elements in the moving area are summed in the accumulator 164. The output signals from accumulators 163 and 164 are applied to the divider 166. The divider 166 takes the accumulated frame difference signal and divides it by the accumulated element difference signal to compute the speed of the moving object which is independent of the size of the object.

Before the beginning of each frame, the synchronization circuit of the camera 112 (not shown for the sake of simplicity) produces a signal which erases the accumulated signals in accumulators 163 and 164. The output signal indicative of speed is applied to the frame repetition circuit 119 of FIG. 1.

In all cases it is to be understood that the foregoing described arrangement is merely illustrative of a small number of the many possible applications of the principles of the invention. Numerous and varied other modifications of digital systems such as video transmission systems, redundancy reduction systems, and multiplexed digital transmission systems in accordance with these principles may readily be devised by those skilled in the art without departing from the spirit and scope of the invention. For example, the variable frame rate video signal which was described as being stored may be transmitted over a suitable medium. Furthermore, the speed measurement circuit was described as controlling the frame recording rate, but it may also be used in a video system to reduce the visual acuity of only the moving object by an amount proportional to its speed.

What is claimed is:

1. A video recording system including a camera for scanning a scene to produce successive video frames of the scene at a predetermined rate and storage means for recording a video signal comprising:

means for determining the speed of a moving object in a video scene comprising sampling means connected to said camera to change the analog video signal into successive picture elements, encoding means for providing a first digital signal indicative of the successive picture elements, first means for summing the absolute magnitude of the encoded differences between successive picture elements in each frame, second means for summing the absolute magnitude of the encoded differences between corresponding picture elements in successive frames, and third means for comparing the accumulated sum of said first means with the accumulated sum of said second means to generate a second signal indicative of the speed of a moving object in the video image;

means for converting the second signal from said third means into a third digital signal indicative of the number of times a frame is shown; and switching means for completing input signal paths to said storage means under the influence of the third digital signal and counting means responsive to said switching means for producing an output signal indicative of the actual number of times a frame will be shown, said switching means completing the input signal paths to said storage means when the third digital signal is equal in value to the output signal of said counting means, said signal paths for the first digital signal and the output signal of said counting means being disrupted to vary the frame-recording rate in accordance with the speed of the moving object thereby minimizing the amount of information recorded in said storage means required to produce a video image of suitable visual quality.

2. The video recording system of claim 1 wherein said first means comprises means for delaying the first digital signal a picture element interval, means for subtracting the input from the output of said means for delaying, and means for storing the sum of the absolute magnitude of the differences between successive picture elements.

3. The video recording system of claim 1 wherein said second means comprises means for delaying the digital signal a frame interval, means for subtracting the input from the output signal of said means for delaying, and means for storing the sum of the absolute magnitude of the differences between corresponding picture elements in successive frames.

4. The video recording system of claim 1 wherein said means for determining speed further comprises switching means for completing the signal paths to said third means only when the frame difference signal exceeds a predetermined threshold level.

5. The video recording system of claim 1 wherein the video recording system further comprises means for storing the third digital signal when said signal path to said storage means is open-circuited, said switching means comparing the current third digital signal with the stored value and closing said signal paths when the current value is less than the stored value to increase the frame recording rate when the speed of a moving object increases.

6. The video recording system of claim 1 wherein the output of said storage means is connected to a readout circuit comprising delaying means for delaying the video output signal from said storage means a frame interval, switching means for completing the signal path to the input of said delaying means, said switching means acting in response to the stored output signal of said counter means obtained from said storage means to open-circuit the signal path to said delaying means and to connect the output to the input of said delaying means to provide a repetition of the frame stored therein when the value of the stored output signal exceeds one.

7. The video recording system of claim 6 wherein the readout circuit further comprises counting means activated when said switching means recirculates the video frame in said delaying means, said switching means completing the signal path from said storage means to said delaying means when the output of said counting means in said readout circuit is equal in value to the stored output signal of said counting means in said recording circuit.

* * * * *